C. PETERSON.
TIRE CHAIN MECHANISM.
APPLICATION FILED DEC. 12, 1911.
1,021,727.
Patented Mar. 26, 1912.
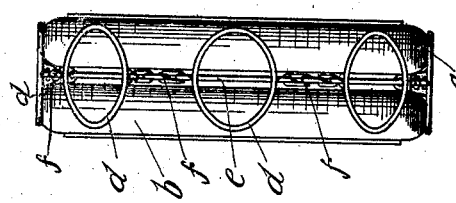
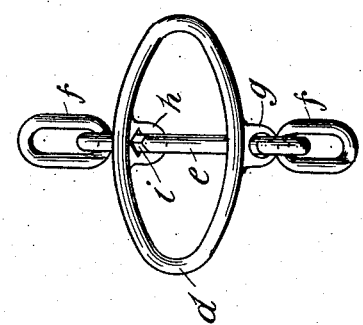
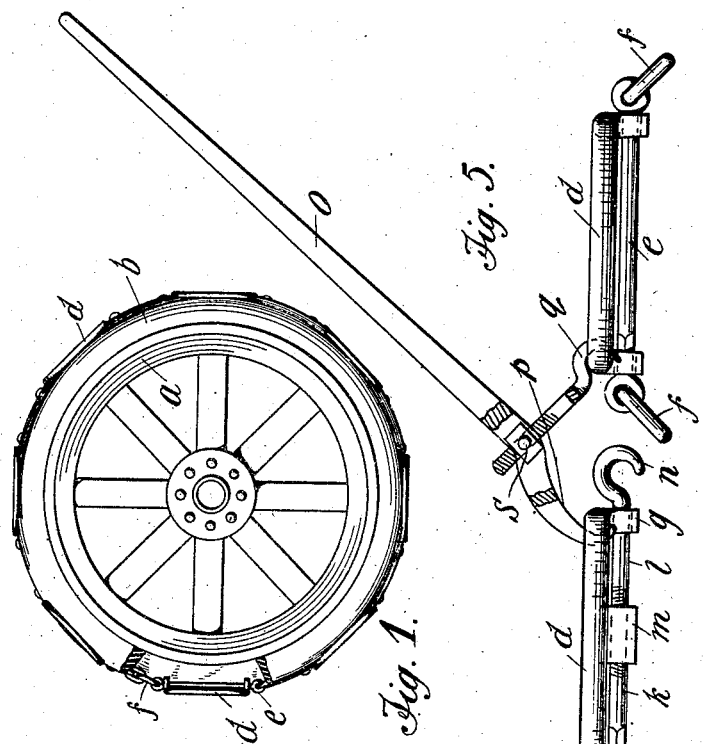
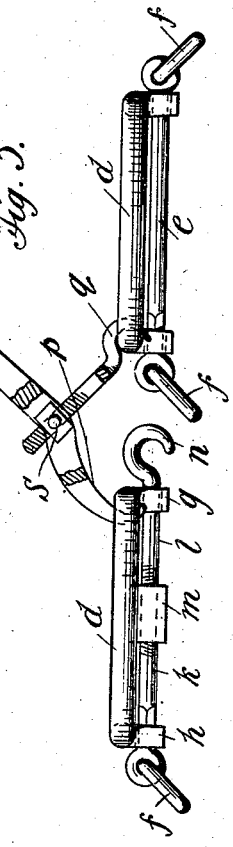
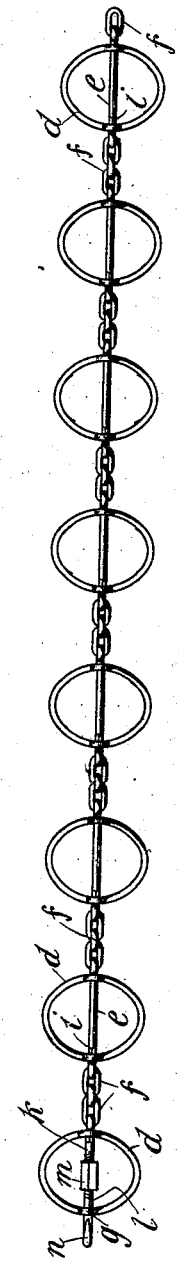
WITNESSES:
INVENTOR
Carl Peterson,
BY
Martin
ATTORNEY

UNITED STATES PATENT OFFICE.

CARL PETERSON, OF PORTLAND, OREGON.

TIRE-CHAIN MECHANISM.

1,021,727.   Specification of Letters Patent.   Patented Mar. 26, 1912.

Application filed December 12, 1911. Serial No. 665,391.

*To all whom it may concern:*

Be it known that I, CARL PETERSON, a subject of the King of Norway, residing at Portland, in the county of Multnomah and State of Oregon, have invented certain new and useful Improvements in Tire-Chain Mechanism, of which the following is a specification.

My invention relates to a chain mechanism for resilient tires, such as are largely used on selfpropelled vehicles.

The tires of heavy automobile trucks are generally made of soft resilient rubber and are frequently of a double construction. That is to say they are so shaped, that a cross sectional view of the tire shows two semicircular treads separated by a rather wide groove.

The object of my invention is to provide a detachable chain mechanism for this type of tires, which will effectually serve to prevent skidding or slipping of the tire, and to this end my device is so constructed, that part of the mechanism is confined within said groove, whereby my device is firmly held in place.

The further objects and advantages of my invention are clearly set forth in the following description, and the appended drawings illustrate a means of reducing my invention to practice.

In the drawings: Figure 1 is a side elevation of a wheel showing my chain mechanism mounted in position, Fig. 2 is an end elevation in agreement with Fig. 1, Fig. 3 shows my device detached, Fig. 4 shows in enlarged perspective one of the chain units, and Fig. 5 illustrates a means of interlocking the ends of my chain mechanism.

Wheel *a* is of any well known construction and its tire presents the two semicircular treads *b, c*. My chain mechanism comprises a uniform series of units, each unit composed of a relative large loop *d* loosely hung on an eyebolt *e*, and a plurality of small connecting links *f*.

By referring to Fig. 4 my means of journaling the loop on the eyebolt is readily seen. The loop is made with diametrically opposite lugs *g, h*, through which the eyebolt extends, and it is noticed that the perforations of said lugs are somewhat larger than the eyebolt. Attention is also called to the shape of the lug perforations, at least one of which, as *i*, is made square, and by squaring the part of the eyebolt which seats in perforations *i*, excessive rotation of the loop on said eyebolt is prevented.

The width of lugs *g, h* is substantially the same as the width of tire groove *j*, and as said lugs seat in said groove, the whole chain mechanism is held against lateral displacement.

In Fig. 5 I show a convenient means of interlocking the ends of my chain mechanism. The unit at one end of the chain is constructed as described above. The bolt of the other end unit is made in two parts *k, l*, the abutting ends of which are provided with right and left screwthreads and adapted to receive a suitable threaded sleeve or turnbuckle *m*, by means of which the length of the chain mechanism is adjusted. The projecting end of bolt member *l* is formed into a hook *n* adapted to engage link *f* of the abutting chain unit.

In order to draw my chain mechanism tightly around the tire I employ a suitable wrench, such as shown in Fig. 5. The wrench lever or handle *o* is made with a bifurcated jaw *p* adapted to grip one loop *d* while the other loop is engaged by a bifurcated jaw *q*, and the latter is provided a stem *r*, the screwthreads of which engage a threaded knuckle *s* journaled in the bifurcation of lever *o*.

Wrench *o*, while convenient for the rapid attachment of the chain mechanism to the tire, is not indispensable as the chain may be interlocked and then drawn tight on the tire by turnbuckle *m*.

Having thus described my invention, I claim:

1. In a tire chain mechanism, in combination with a dual tread tire; a plurality of loops; a pair of lugs on each loop, said lugs adapted to engage the groove of the tire; a continuous chain comprising a series of eyebolts journaled in said lugs and a series of intermediate links connecting said eyebolts; means for adjusting the length of the chain; and means coöperating with said adjusting means for interlocking the ends of the chain.

2. In combination with a grooved resilient tire, a detachable chain mechanism comprising: a series of loops adapted to seat on the peripherical surface of the tire; perforated lugs on said loops adapted to engage the tire groove, whereby said loops are held against transverse displacement; a chain composed of a series of eyebolts journaled in the perforations of said lugs and provided with means for limiting the oscillatory motion of the loops on the eyebolts, and a series of intermediate links operatively connecting said eyebolts; and means for adjustably interlocking the ends of said chain.

In testimony whereof I affix my signature in the presence of two witnesses.

CARL PETERSON.

Witnesses:
IRENE MOORE,
C. W. HILLS.